Oct. 15, 1929.　　　　K. F. W. KEMPF　　　　1,731,423
METHOD OF MANUFACTURING KEY BOLTS
Filed May 10, 1926　　　3 Sheets-Sheet 1

Karl F. W. Kempf, Inventor.
By Emil Neuhart
Attorney.

Witness:
J. T. Oberst.

Oct. 15, 1929.  K. F. W. KEMPF  1,731,423
METHOD OF MANUFACTURING KEY BOLTS
Filed May 10, 1926   3 Sheets-Sheet 2
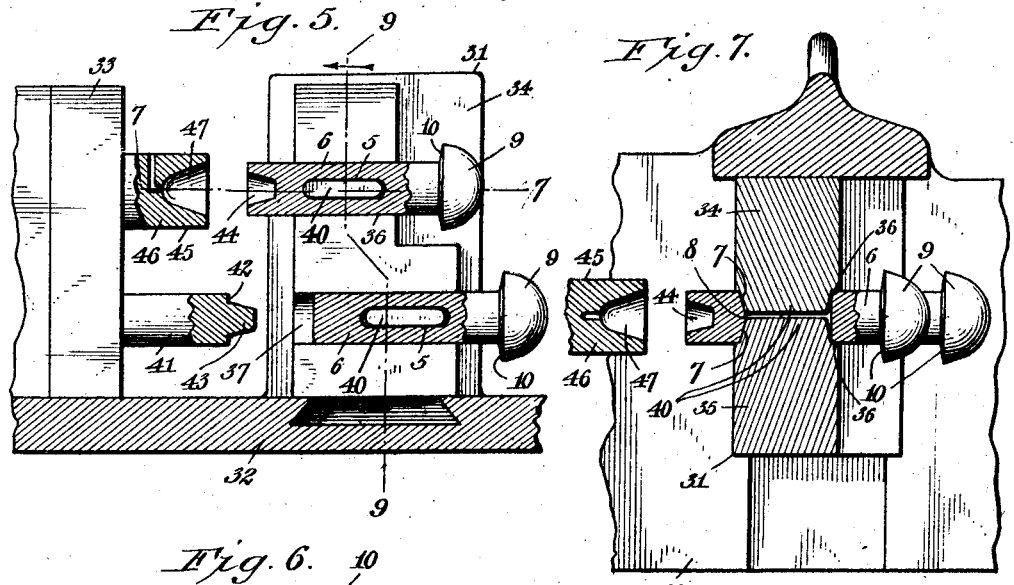
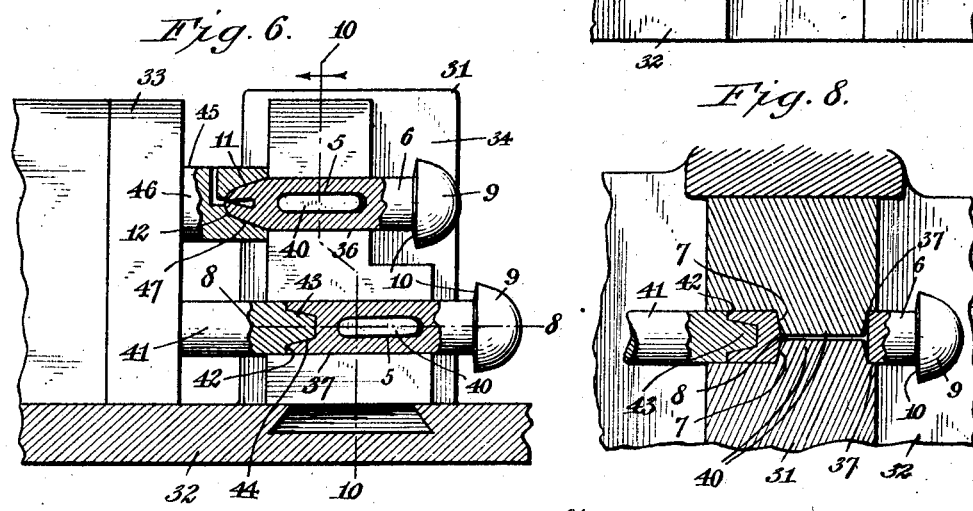
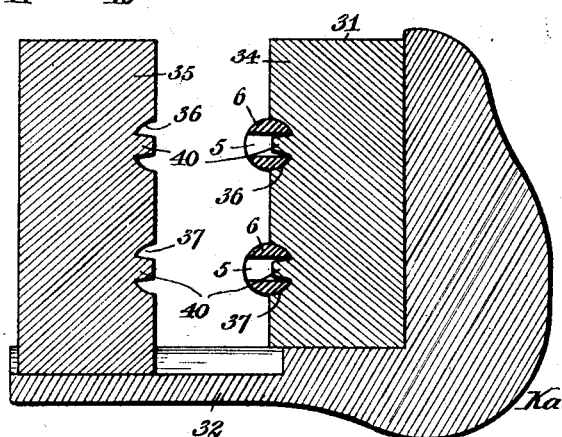
Karl F. W. Kempf,
Inventor
Emil Furhart
Attorney.

Oct. 15, 1929.  K. F. W. KEMPF  1,731,423
METHOD OF MANUFACTURING KEY BOLTS
Filed May 10, 1926   3 Sheets-Sheet 3
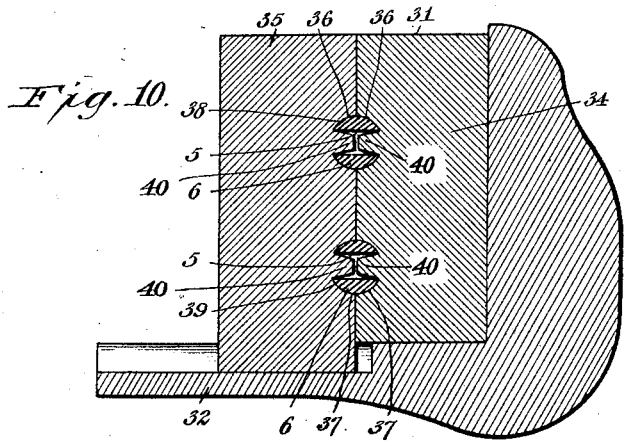
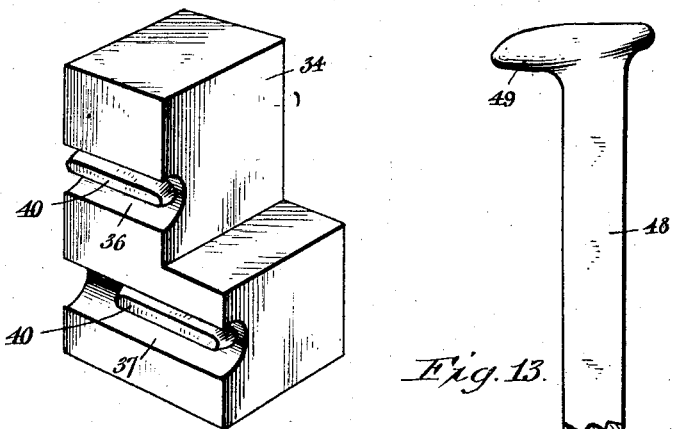
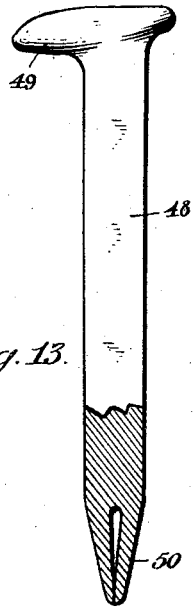
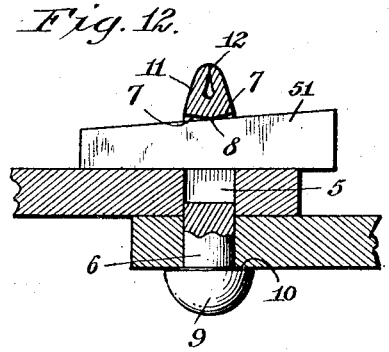
Karl F. W. Kempf,
Inventor.
By Emil Keulast
Attorney.

Patented Oct. 15, 1929

1,731,423

UNITED STATES PATENT OFFICE

KARL F. W. KEMPF, OF BUFFALO, NEW YORK, ASSIGNOR OF ONE-HALF TO FREDERICK G. GARVEY, OF BUFFALO, NEW YORK

METHOD OF MANUFACTURING KEY BOLTS

Application filed May 10, 1926. Serial No. 108,047.

This invention relates to a method of manufacturing bolts, and especially to key bolts.

The primary object of my invention is the production of a bolt or other similar article, such as spikes and the like, in which provision is made for the ready entrance, by driving or otherwise, into an object or objects, and especially into overlapping or overlying objects having bolt holes slightly out of complete registration.

Another object of this invention is the provision of a key bolt constructed to eliminate the tendency of such bolts being forced out of straight line when driving a key into or through the same for fastening objects together.

Another object of my invention is the provision of a new and novel method for constructing key bolts or the like, and especially for providing the same with a tapered entrance end.

With the above and other objects in view to appear hereinafter, the invention consists in the novel construction of bolts or like objects as hereinafter specified, and in the novel method of manufacturing the same.

The invention further consists in the new and novel steps and arrangement and combination of steps employed in the method of producing the same, as hereinafter set out and more particularly pointed out in the subjoined claims.

In the drawings:—

Fig. 5 is a sectional elevation of my improved tapering mechanism, illustrating the method of practicing certain steps in the production of my invention, the parts of said mechanism being in in-operative positions.

Fig. 6 is a similar view showing the parts of said mechanism in operating positions.

Fig. 7 is a horizontal section, taken on line 7—7, Fig. 5.

Fig. 8 is a horizontal section taken on line 8—8, Fig. 6.

Fig. 9 is a transverse vertical section, taken on line 9—9, Fig. 5, and looking in the direction of the arrow crossing said line; the clamping bolt-retainer block being in open condition.

Fig. 10 is a transverse vertical section, taken on line 10—10, Fig. 6, and looking in the direction of the arrow crossing said line; the clamping bolt-retainer block being in closed or clamping condition.

Fig. 11 is a detached perspective view of one of the sections of the clamping bolt-retainer block.

Fig. 12 is a sectional elevation of a key bolt constructed in accordance with my invention, it being shown connecting two plates or structural elements together.

Fig. 13 is a sectional elevation of a rail spike showing my invention embodied therein.

Figure 1:
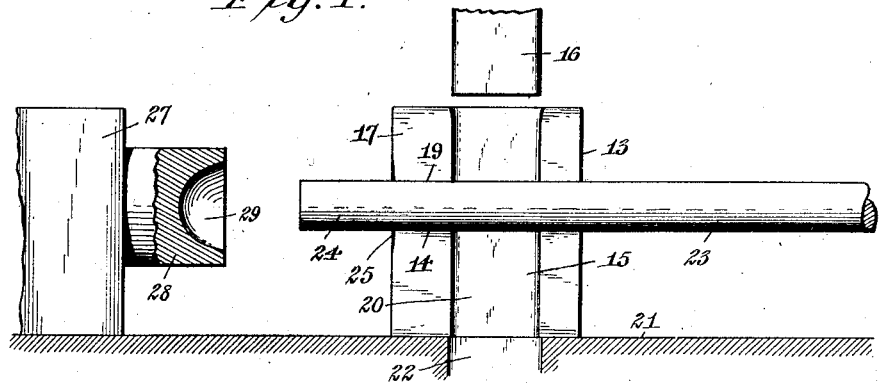
Fig. 1 is a sectional elevation of my improved slotting and heading mechanism, the co-operating parts thereof being shown in in-operative position.
Figure 2:
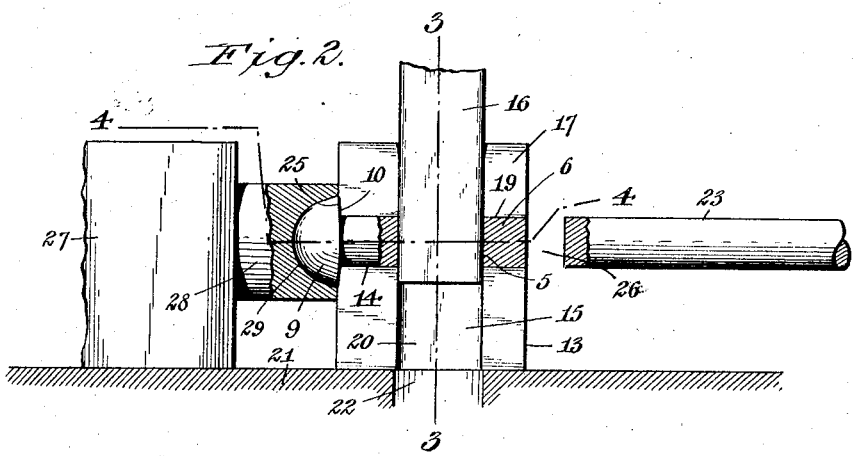
Fig. 2 is a similar view showing the parts in operating position.
Figure 3:
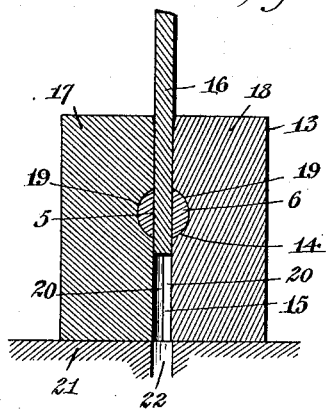
Fig. 3 is a vertical section taken on line 3—3, Fig. 2.
Figure 4:
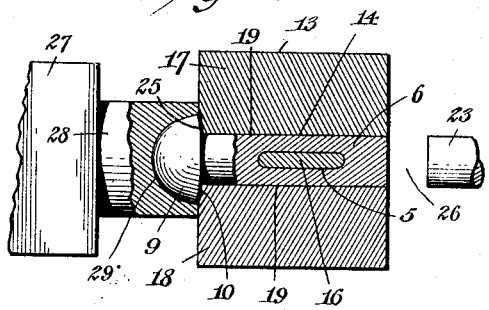
Fig. 4 is a horizontal section taken on line 4—4, Fig. 2.

Having reference first to a key bolt constructed in accordance with my invention and by means of my improved method, it may be stated that the key bolts are slotted diametrically for the purpose of forcing wedge keys thereinto, which serve to draw the bolts tight under all conditions of use. Such bolts are invariably employed for temporary or setting-up work, such as the fitting together of plates adapted to be permanently secured by means of rivets or other suitable fastening devices. As generally used, a key bolt extends a considerable distance through the parts or objects which it temporarily secures together and the key used in conjunction therewith is passed into the extending portion of the bolt, and when driven tightly into position tends, under ordinary conditions, to flex the extending portion of the bolt so that it assumes a position out of line with the remainder of the bolt, thus making it impossible, when badly flexed, to again use the bolt.

To overcome this tendency, the key slot of my improved bolt, designated by the numeral 5, and arranged to extend diametrically through the shank 6 of the key bolt, has its outer wall beveled outwardly or receding in opposite directions, as at 7, from a plane centrally between the ends thereof, indicated at 8, so that the slot is somewhat shorter along the center of the bolt than at opposite sides of the same.

The key bolt has a head 9 at one end to provide the usual stop shoulder 10 for the purpose of providing a bearing against the face of one of the objects through which the bolt is passed, and this stop shoulder is made convex or outwardly receding so that if any play is permitted the shank of the bolt within the opening or openings through which it is passed, said shoulder will receive firm bearing at one or the other side of a plane passing lengthwise centrally through the bolt. Therefore, when passing a key through the slot of the bolt, the shank of the bolt will be free to move laterally in one or another direction, depending upon the stress applied to the shank thereof by the key driven through its slot, and at the same time the head 9 will have a sufficient permanent bearing against the object through which the bolt is passed to assure the proper tightening of the bolt. This convexity provided on the inner face or shoulder of the head 9 gives the head a proper bearing against any irregular surface on the face of one of the objects through which the bolt is passed, even though the shank of the bolt has a tight fit within the opening or openings into or through which it is driven, and this assures a proper setting-up of the parts adapted to be connected together by permanent fastening means, to be later applied.

The unheaded or entrance end of the bolt is tapered, as at 11, and its extremity preferably rounded, as at 12, the taper preferably extending from the slotted portion of the bolt outwardly to the rounded extremity. This taper is preferably formed according to my improved method, to be presently described, and simultaneously therewith the oppositely-beveled portions, 7, hereinbefore referred to, are formed.

In Figs. 1 to 4 of the drawings, heading and slotting mechanism is shown in connection with a rod adapted to be cut by suitable means (not shown) into bolt lengths and be diametrically slotted and headed to partially form a bolt of the kind referred to. For this purpose a rod-retaining block or body 13, having a cylindrical rod-receiving opening 14 and a tool slot 15 perpendicular thereto, is provided, said block having a slotting tool 16 in co-operation therewith.

In preferred form, said rod-receiving block or body 13 comprises two sections 17, 18 which are exact counterparts and adapted to lie in contact wtih each other, each section having a semi-cylindrical groove 19 formed in its contacting face which form the rod-receiving opening 14. Intersecting each of these semi-cylindrical grooves is a depression 20, one in each contacting surface of the sections 17, 18 of the block, these depressions forming the tool slot 15 perpendicular to the cylindrical opening 14 in said block.

Said rod-receiving block or body 13 has its sections relatively movable, preferably one movable toward and from the other, and the sections arranged upon a table or other suitable support 21, which may also have an opening 22 therethrough, preferably somewhat larger in transverse and longitudinal dimensions than the dimensions of the tool slot 15 in said block or body.

A rod from which the bolts are to be constructed is designated by the numeral 23, and this rod is clamped in and extends through the cylindrical opening 14 in the block 13 so that the end portion thereof projects from one end of the block, as at 24, this projecting portion containing sufficient metal to enable the head 9 of the bolt to be formed therefrom. It is, of course, to be understood that the rod 23 is held within the block 13 against lengthwise movement in any suitable manner, but preferably such movement is prevented by the clamping effect of the sections 17 and 18 on the rod.

That end of the block from which the end of the rod to be headed projects is provided with a concavity 25 which surrounds the end of the cylindrical opening 14 in the block, and when a rod is placed within the block, said cavity surrounds the rod, as clearly shown in Fig. 1.

With the rod positioned against lengthwise movement within the block 13, the slotting tool 16 is driven downwardly into the tool slot 15 of the block and diametrically through the rod for the purpose of forming the slot 5. Before, during, or after this slotting operation, the rod 23 is severed, as at 26, so that the bolt to be formed will be of the desired length and this length may be governed by the entrance end of the block, or in any other approved manner. The material forced from said rod to form the slot 5 of the bolt, passes downwardly through the lower end of the tool slot 15 of the block and out through the opening 22 formed in the table or other foundation provided for the block, and may there be accumulated as scrap.

Before, during, or after the slotting operation, the projecting portion 24 of the rod, or the severed portion of the rod, as the case may be, is upset to form the head 9 of the bolt, and for this purpose an upsetting device 27 is provided, which is movable lengthwise toward and from the block 13. This upsetting device, or heading device, as it may be termed, is provided with a socketed member 28, the socket 29 thereof being shaped to the form which the head of the bolt is to be fashioned to; and invariably, key bolts are provided with substantially semi-spherical heads. Therefore, the socket 29 in the socketed member 28 is preferably of semi-spherical formation.

Under proper pressure or force applied in any approved manner to the upsetting or heading device 27, it engages the projecting end 24 of the rod 23, or the severed portion thereof, reduces the length of said projecting portion and forces the metal thereof laterally or radially in all directions so as to completely fill the socket 29 in said device and also force the laterally extended portions of the upset or headed metal into the cavity 25 formed in the adjacent end of the block. It will therefore be observed that the block or body used in the slotting operation, also serves as part of the upsetting or heading mechanism, and when the head is formed on the rod or severed portion of the rod, as clearly illustrated in Fig. 2, the inner face or shoulder 10 thereof will be convexed slightly, or as it may be termed, made to recede outwardly, for the purpose hereinbefore stated.

After the rod is severed to provide the proper length of material for forming the bolt, the transverse slot formed therein, and the head formed upon one end thereof, the so partially-constructed bolt is acted upon by a second set of co-operating members, which serves as indenting and tapering mechanism, and incidentally to form the opposite bevels 7 on the outer end wall of the key slot. This set of co-operating members comprises a bolt-retainer block or body 31, which is held in a fixed position upon the table or support 32,—the latter, if desired, being the table 21, hereinbefore referred to—and a pressure or power device 33, suitably operated and arranged at one end of said bolt-retainer block for movement toward and from the same.

The bolt-retainer block or body 31 is also made of two sections 34, 35, one of which is preferably movable toward and from the other. On the opposing faces of the two sections, semi-cylindrical grooves 36, 37 are formed, one above the other, the grooves 36 being in the same plane and the grooves 37 likewise disposed relatively, and when the sections of the block are brought together, these grooves form cylindrical bolt-retaining openings 38, 39, respectively. Lengthwise disposed in each of the grooves 36, 37 and terminating short of the ends thereof, are bolt-retainer keys 40, the keys of the grooves in like planes being opposed to each other and when the two sections of the block are brought together the longitudinal edges of these keys are slightly separated.

The keys project from the walls of the semi-cylindrical grooves and are slightly tapered toward their longitudinal edges. The ends of the grooves are also tapered, for a purpose to appear hereinafter. When the two sections of the block are brought into contact to form the cylindrical bolt-retainer openings 38, 39, said openings may be said to have bolt-retainer keys projecting inwardly from their walls at diametrically opposite sides.

In the lowermost bolt-receiving opening 38 the outer ends of the partially formed bolts are first inserted, this being accomplished when the two sections of the bolt-retainer block or body 31 are separated, the bolt adapted for further operation being placed within the lower semi-cylindrical groove 36 in one of the sections of said block with the key in said groove entered into the key slot 5 of the partially formed bolt, after which the other section is moved in contact with the section having the bolt applied thereto so as to completely encircle the bolt and cause the bolt-retainer key of said other section to enter the key slot of said bolt from the opposite side. With the two sections of the bolt-retainer block or body in contact, the partially formed bolt will be firmly gripped within said block or body and will be held against lengthwise movement by the bolt-retainer keys entered into the key slot of the partially formed bolt from opposite sides.

The pressure or power device 33 is provided with an indenter 41 in the form of a cylindrical extension arranged to project from that end of the pressure or power device opposing said bolt-retaining block. This indenter has its free end portion reduced in diameter to form a stop shoulder 42, and the reduced portion is made frusto-conical, as at 43. After a bolt is inserted in the lower opening 39 of the bolt-retainer block, the pressure or power device 33 is advanced, with the result that the indenter 41 is inserted into the lower opening 39 and brought in contact with the unheaded end of the partially formed bolt, after which the conical end of the indenter 41 will be forced axially into the unheaded end of the bolt, with the result that the metal at this outer end is condensed and also moved or forced lengthwise against the adjacent tapered ends of the bolt-retainer keys 40 entered into the key slot of said partially formed bolt, thus causing the outer end wall of the key slot 5 within said bolt to be beveled in opposite directions, as indicated in Fig. 8. During this step in the method employed, the bolt is provided with an axially arranged outwardly-flaring depression or socket 44 in its unheaded end, and simultaneously therewith the opposite bevels are formed on the outer end wall of said key slot, and during such operation the major portion of the bolt is confined within the bolt-retainer block and cannot become flexed or enlarged diametrically.

The slotted and axially indented bolt thus far formed is what I term a rudimentary bolt, which may be sold in such form, and where the tapered end is not necessary, may be used quite effectively, since it possesses the advantages which the oppositely beveled outer end wall of the key slot furnishes. The so rudimentarily formed key bolt may be tapered at any time, even though previously used. However, when the various steps of the method are employed in a continuous manner, the partly completed bolt may be considered a bolt blank at any stage of manufacture, and until the final step of tapering the end thereof has been completed. It will therefore be apparent that under certain conditions, the partly completed bolt may be termed a rudimentary bolt, while under other conditions the bolt partly completed to the same or any other stage in the process of manufacture may be termed a bolt blank.

It may here be stated that by tapering the bolt-retainer keys from the walls from which they extend to their longitudinal edges and also at opposite ends, they may be freely entered into the key slot of the partially formed bolt, and after the bolt is provided with its axial socket and the opposite bevel formed on the outer end of said slot, assurance will be had that the bolt can be readily removed from the bolt-retainer block during or after the separation of the sections thereof.

While the tapering of the ends of the bolt-retainer keys assist in the ready entrance of said keys into the key slot of a partially formed bolt, the tapering of the ends of said keys adjacent the outer end wall of the key slot also serve as the bevel-forming means for said outer end wall.

After withdrawing the pressure or power device so that it assumes its in-operative position, as indicated in Fig. 5, the axially indented bolt blank is withdrawn from the lower opening 39 of the bolt-retainer block and inserted into the upper opening 38 thereof. At the same time an unindented bolt blank is inserted in the lower opening so that after the first bolt is indented and the outer end wall of the diametral slot thereof beveled in opposite directions, a double operation takes place under each movement of the pressure or power device 33.

The headed ends of the bolt blanks extend from the bolt-retainer block a sufficient distance to permit of their being gripped with tongs for the purpose of conveniently removing them after being operated upon, and the bolt-retainer block is of a length to permit the projection of the headed end of the upper bolt blank and at the same time assure proper projection of the unheaded end thereof, which unheaded end is now adapted to be tapered and necessitates the proper amount of projection for this purpose. This is exactly determined by reason of the fact that the bolt-retainer keys in the upper bolt-retainer opening 38 are entered in the key slot of the bolt blank, and when said blank is properly positioned, the indented end portion of the bolt extends from that end of the block opposed to the pressure or power device, for operation thereon by a tapering element 45 which is in the form of a cylindrical extension 46 on said pressure or power device alined with the upper opening 38 in said block. This tapering element is consequently axially coincident with the axis of the bolt blank inserted in said opening, and it has an inwardly tapered socket 47 at its outer end, the formation of which is that to which the unheaded end of the bolt is to be fashioned. In the particular illustration shown, this socket 47 is tapered inwardly and rounded at its inner end, the diameter of the taper at its outer end being a trifle larger than the diameter of the projecting indented end of the bolt blank to be operated upon. Therefore, when the pressure or power device 33 is advanced, the tapering device 45 will engage the projecting indented end of the bolt in the upper opening 38, and with proper power or pressure applied, the wall of the tapering socket 44 formed in the bolt blank will be moved inwardly and at the same time the metal of the projecting end of said bolt will be further condensed.

The indented portion or axial socket in said bolt is thus fully closed, as indicated in Fig. 6. At the same time that this operation takes place any partially formed bolt placed within the lower opening 39 of the bolt-retainer blank will be axially indented in the manner hereinbefore described.

In the drawings the completed bolt is shown as having its conical end hollow, and with the metal between the end of the finished bolt and the outer end wall of the key slot thoroughly condensed by the steps in the method employed for shaping said portion of the bolt, the bolt will be exceedingly durable and capable of withstanding all strains to which it may be subjected.

While the bar from which the bolts are constructed is properly heated before operating upon the same and may require two or more heats, depending on the continuity of the steps of the process, it is of course to be understood that when constructing comparatively small bolts, or even when constructing larger bolts of certain kinds of metal under the method described, the stock operated upon may be cold.

While this invention and the method under which it is produced are particularly desirable in the manufacture of key bolts, it may be employed in the manufacture of railroad spikes and other articles, and as an illustration of this, Fig. 13 shows a railroad spike which has a rectangular shank 48, the usual head 49, offset at one side to a greater extent than the other, and the usual tapered end 50.

When constructing spikes of this kind, or spikes having cylindrical shanks, the openings in the rod-receiving block and in the bolt-receiving block will be made to conform to the cross sectional formation of the shank of the spike, and as spikes of this kind are of considerable length, a long grip will be furnished on the spike when the two sections of each of the blocks are brought together, such grip being sufficient to prevent lengthwise movement within the block of the bar, or section of bar, from which the spike is to be formed. However, any other means to prevent lengthwise movement of the bar or section of bar may be employed, if desired. The socket in the heading or upsetting device 28 will be shaped to conform to the shape which the head of the spike is to have and the socket in the tapering device 45 will be of a shape to conform to that which the pointed end of the spike is to have when completed.

In Fig. 12 I have shown a key bolt constructed according to this invention, and under the method described, it being shown as used in connection with a pair of plates or structural elements having overlapping portions provided with registering rivet or bolt holes. The key bolt is inserted through the registering rivets or bolt holes and the outer end thereof projects beyond the inner surface of the inner plate or structural element, a portion of the transverse key slot in said bolt being exposed. By reason of the key bolt being tapered it can be driven freely through the holes, even though slightly out of registration, and during the act of driving the bolt through such elements, the plates or structural elements will be shifted so as to bring said holes into true registration.

In structural work, long tapered centering tools—usually long tapered handles on wrenches—are invariably tmployed for the purpose of bringing the rivet or bolt holes of two parts or objects into registration, after which key bolts of ordinary form, or common bolts, are driven through the registering bolt holes. However, after bringing the bolt holes into registration and withdrawing the centering tool, it is often found that a re-shifting of the parts or objects, takes place so that the rivet or bolt holes again become disalined, before it is possible to drive key bolts or common bolts through said holes. The alining and maintaining of rivet or bolt holes under such conditions is a difficult operation, especially on structural work having only one pair of bolt holes through which a key or other bolt is to be passed.

When a key bolt constructed in accordance with my invention is inserted through registering rivet or bolt holes, and the convex shoulder formed by the head is brought into firm bearing with the outer surface of the outer part or object of structural work, a wedge key 51 is driven into the diametral slot of said key bolt, the tapered edge of said key coming in contact with the outer end wall of said slot, and by reason of said outer end wall being oppositely beveled or made to recede from its center outwardly in opposite directions, the key may be driven into the diametral slot from either side. Furthermore, by providing the outer end wall of said diametral key slot with opposite bevels, the tapered edge of the wedge key will engage the high central point or crest of said wall and slide freely along said wall while drawing the bolt tight in a straight line. There is no tendency of the projecting end of the bolt to flex in the direction in which the key is driven and consequently the bolt will be retained in a perfectly straight condition regardless of the amount of force applied to the wedge key. This makes it possible to use these key bolts a great number of times.

In the claims it is to be understood that the term "bolt" or "key bolt", is to include any article tapered at one end, whether headed or unheaded, and also under certain claims any headed article whether having a tapered or untapered end; and it is further to be understood that the certain steps in the method described may be performed in any desired order of succession without departing from my invention or sacrificing any of the advantages thereof.

Having thus described my invention, what I claim is:—

1. The method of manufacturing key bolts, which includes the confining of a portion of the shank of a headed partially-formed diametrically-slotted bolt blank in a surrounding body, providing oppositely-beveled stop means within the slot at said bolt blank, axially indenting the end of said shank within said confining body to form an axial socket, compressing the metal of the wall of said socket and forcing metal of said shank lengthwise against said oppositely-beveled stop means to cause the outer end wall of said diametral slot to become oppositely beveled, the crest of said outer end wall being in a plane extending lengthwise centrally through said shank and at right angles to the plane of said diametral slot.

2. The method of manufacturing key bolts, which includes the confining of a portion of a diametrically-slotted and headed bolt blank within a surrounding body, entering oppositely tapered stops in the diametral slot of said bolt blank, axially indenting the end of said bolt blank to form an axial socket therein, forcing the outer end wall of the diametral slot of said blank inwardly against said tapered stops to form opposite bevels thereon, and forcing the metal of the wall of said axial socket inwardly toward the axis of said bolt blank to taper the same while retaining said bolt blank against lengthwise movement.

3. The method of manufacturing bolts, which consists in diametrically slotting a bar and cutting said bar to desired length to form a bolt blank, in heading one end of said bar or bolt blank, in axially indenting the unheaded end of said bolt blank to form an inwardly-tapered socket and simultaneously therewith forcing the outer end wall of the slot of said bolt blank inwardly to gradually reduce the length of said slot from opposite sides of said bolt blank toward the longitudinal center thereof, and in then subjecting the indented end of said bolt blank to pressure inwardly from all external points for the purpose of tapering said end and closing or eliminating the socket therein.

4. The method of manufacturing key bolts, which consists in confining a portion of a rod within a surrounding body and having the end of said rod projecting from one end of said body, in diametrically slotting said rod within said surrounding body, in heading the projecting end of said rod and holding said rod against lengthwise movement while the slotted portion thereof is confined within said body, in inserting the unheaded end of said bolt blank so formed within a confining body, in axially indenting said unheaded end within said confining body to form an axial socket while holding said bolt blank against lengthwise movement, and in forcing the metal of said bolt blank surrounding said axial socket inwardly toward the axis of said blank so as to taper said end and close or eliminate said axial socket.

In testimony whereof I affix my signature.

KARL F. W. KEMPF.